(12) United States Patent
Scherschlicht et al.

(10) Patent No.: US 10,459,124 B2
(45) Date of Patent: Oct. 29, 2019

(54) LAYER SYSTEM AND OPTICAL ELEMENT COMPRISING A LAYER SYSTEM

(71) Applicant: RODENSTOCK GMBH, München (DE)

(72) Inventors: Rüdiger Scherschlicht, Unterhaching (DE); Michael Vögt, Gilching (DE)

(73) Assignee: RODENSTOCK GMBH, München (DE)

( * ) Notice: Subject to any disclaimer, the term of this patent is extended or adjusted under 35 U.S.C. 154(b) by 45 days.

(21) Appl. No.: 15/541,106

(22) PCT Filed: Oct. 19, 2015

(86) PCT No.: PCT/EP2015/074173
§ 371 (c)(1),
(2) Date: Jun. 30, 2017

(87) PCT Pub. No.: WO2016/110339
PCT Pub. Date: Jul. 14, 2016

(65) Prior Publication Data
US 2018/0259682 A1 Sep. 13, 2018

(30) Foreign Application Priority Data
Jan. 7, 2015 (DE) .......... 10 2015 100 091

(51) Int. Cl.
*G02B 5/28* (2006.01)
*G02B 1/115* (2015.01)
(Continued)

(52) U.S. Cl.
CPC .............. *G02B 1/115* (2013.01); *G02B 5/28* (2013.01); *G02B 27/0012* (2013.01); *G02C 7/02* (2013.01); *G02C 7/10* (2013.01)

(58) Field of Classification Search
CPC ............ G02B 1/11; G02B 1/111; G02B 1/115
(Continued)

(56) References Cited

U.S. PATENT DOCUMENTS 6,590,702 B1  7/2003  Shirai
6,628,456 B2 *  9/2003  Takaki ............... G02B 1/11
                                                359/356

(Continued)

FOREIGN PATENT DOCUMENTS

DE    101 01 017 A1    7/2002
EP    0 855 604 A1    7/1998
(Continued)

OTHER PUBLICATIONS

International Preliminary Report on Patentability (PCT/IPEA/409) issued in PCT/EP2015/074173, completed on Apr. 13, 2017.
(Continued)

*Primary Examiner* — Audrey Y Chang
(74) *Attorney, Agent, or Firm* — Birch, Stewart, Kolasch & Birch, LLP

(57) ABSTRACT

A layer system includes at least one stack of successive multilayers, wherein each multilayer includes a first partial layer with a first optical thickness and a second partial layer with a second optical thickness that is different from the first optical thickness. The multilayer has optical characteristics that are specified depending on a parameter which is a function of a ratio of quotients of the optical thickness of a partial layer with higher refractive characteristics and the optical thickness of a partial layer with lower refractive characteristics of the respective multilayers, wherein the index i denotes the order of the successive multilayers in the stack. The product of a reflectivity of the stack of multilayers and the parameter is less than for an anti-reflection and/or anti-reflective effect of the stack of multilayers, or is greater
(Continued)

than or equal to 1 for a mirroring. An optical element may include a layer system and a method for producing such a layer system.

6 Claims, 14 Drawing Sheets

(51) Int. Cl.
    *G02B 27/00*      (2006.01)
    *G02C 7/02*       (2006.01)
    *G02C 7/10*       (2006.01)

(58) Field of Classification Search
    USPC ................................................ 359/584, 586
    See application file for complete search history.

(56) References Cited

U.S. PATENT DOCUMENTS

| | | | | |
|---|---|---|---|---|
| 8,189,261 B2* | 5/2012 | Tomoda | ............... | G02B 1/111 359/588 |
| 8,882,280 B2* | 11/2014 | Fukaya | ............... | G02B 1/11 359/507 |
| 2008/0261008 A1 | 10/2008 | Kiyokawa et al. | | |
| 2014/0078589 A1* | 3/2014 | Fujii | ............... | G02B 1/115 359/601 |
| 2015/0098058 A1 | 4/2015 | De Ayguavives et al. | | |

FOREIGN PATENT DOCUMENTS

| | | |
|---|---|---|
| EP | 2 816 379 A1 | 12/2014 |
| JP | 11-30703 A | 2/1999 |
| JP | 2003-248103 A | 9/2003 |
| JP | 2006-165493 A | 6/2006 |
| JP | 2012-93689 A | 5/2012 |
| WO | WO 2008/000841 A2 | 1/2008 |
| WO | WO 2013/122253 A1 | 8/2013 |
| WO | WO 2013/171434 A1 | 11/2013 |
| WO | WO 2013/171435 A1 | 11/2013 |

OTHER PUBLICATIONS

International Search Report (PCT/ISA/210) issued in PCT/EP2015/074173, dated Jan. 18, 2016.
Japanese Office Action dated Jul. 3, 2018 for Application No. 2017-535673.

* cited by examiner

|  |  | Antiref_g | | | Antiref_bb | | | Antiref_uv | | |
|---|---|---|---|---|---|---|---|---|---|---|
|  |  | MAT | d / nm | FWOT | MAT | d / nm | FWOT | MAT | d / nm | FWOT |
| 24 | 32 | SiO$_2$ | 74,3 | 0,20 | SiO$_2$ | 90,0 | 0,24 | SiO$_2$ | 70,4 | 0,19 |
| 24 | 54 | Al$_2$O$_3$ | 10,0 | 0,03 | Al$_2$O$_3$ | 10,0 | 0,03 | Al$_2$O$_3$ | 10,0 | 0,03 |
| 24 | 30 | Ta$_2$O$_5$ | 149,0 | 0,55 | Ta$_2$O$_5$ | 124,0 | 0,46 | Ta$_2$O$_5$ | 77,7 | 0,29 |
| 22 | 32 | SiO$_2$ | 15,8 | 0,04 | SiO$_2$ | 30,0 | 0,08 | SiO$_2$ | 1,9 | 0,00 |
| 22 | 30 | Ta$_2$O$_5$ | 62,4 | 0,17 | Ta$_2$O$_5$ | 27,0 | 0,07 | Ta$_2$O$_5$ | 31,8 | 0,09 |
| 20 | 32 | SiO$_2$ | 25,5 | 0,07 | SiO$_2$ | 42,0 | 0,11 | SiO$_2$ | 16,1 | 0,04 |
| 20 | 30 | Ta$_2$O$_5$ | 24,2 | 0,09 | Ta$_2$O$_5$ | 6,0 | 0,02 | Ta$_2$O$_5$ | 15,0 | 0,06 |
| σ |  |  | 0,21 |  |  | 0,08 |  |  | 0,07 |  |
| Rm |  |  | 1,89 |  |  | 1,22 |  |  | 1,15 |  |
| σ* Rm |  |  | 0,39 |  |  | 0,09 |  |  | 0,08 |  |

Fig. 5

|  |  | Antiref_f | | | Antiref_r | | | Antiref_go | | |
|---|---|---|---|---|---|---|---|---|---|---|
|  |  | MAT | d / nm | FWOT | MAT | d / nm | FWOT | MAT | d / nm | FWOT |
| 24 | 32 | SiO$_2$ | 71,9 | 0,19 | SiO$_2$ | 69,0 | 0,18 | SiO$_2$ | 74,1 | 0,20 |
| 24 | 54 | Al$_2$O$_3$ | 10,0 | 0,03 | Al$_2$O$_3$ | 10,0 | 0,03 | Al$_2$O$_3$ | 10,0 | 0,03 |
| 24 | 30 | Ta$_2$O$_5$ | 71,0 | 0,26 | Ta$_2$O$_5$ | 50,0 | 0,18 | Ta$_2$O$_5$ | 35,0 | 0,13 |
| 22 | 32 | SiO$_2$ | 1,3 | 0,00 | SiO$_2$ | 12,0 | 0,03 | SiO$_2$ | 26,8 | 0,07 |
| 22 | 30 | Ta$_2$O$_5$ | 52,8 | 0,14 | Ta$_2$O$_5$ | 38,0 | 0,10 | Ta$_2$O$_5$ | 27,2 | 0,07 |
| 20 | 32 | SiO$_2$ | 26,6 | 0,07 | SiO$_2$ | 28,0 | 0,07 | SiO$_2$ | 33,9 | 0,09 |
| 20 | 30 | Ta$_2$O$_5$ | 19,3 | 0,07 | Ta$_2$O$_5$ | 12,0 | 0,04 | Ta$_2$O$_5$ | 11,9 | 0,04 |
| σ |  |  | 0,02 |  |  | 0,15 |  |  | 0,31 |  |
| Rm |  |  | 0,88 |  |  | 1,83 |  |  | 2,01 |  |
| σ* Rm |  |  | 0,02 |  |  | 0,27 |  |  | 0,62 |  |

Fig. 6

|  |  | V_b | | | V_r | | | V_g | | | V_go | | |
|---|---|---|---|---|---|---|---|---|---|---|---|---|---|
|  |  | MAT | d/nm | FWOT | MAT | d/nm | FWOT | MAT | d/nm | FWOT | MAT | d/nm | FWOT |
| 24 | 32 | SiO$_2$ | 110,3 | 0,29 | SiO$_2$ | 63,0 | 0,17 | SiO$_2$ | 162,3 | 0,43 | SiO$_2$ | 50,0 | 0,13 |
| | 54 | Al$_2$O$_3$ | 10,0 | 0,03 | Al$_2$O$_3$ | 10,0 | 0,03 | Al$_2$O$_3$ | 10,0 | 0,03 | Al$_2$O$_3$ | 10,0 | 0,03 |
| | 30 | Ta$_2$O$_5$ | 66,2 | 0,24 | Ta$_2$O$_5$ | 58,0 | 0,21 | Ta$_2$O$_5$ | 56,5 | 0,21 | Ta$_2$O$_5$ | 75,0 | 0,28 |
| 22 | 32 | SiO$_2$ | 18,7 | 0,05 | SiO$_2$ | 60,0 | 0,16 | SiO$_2$ | 99,0 | 0,26 | SiO$_2$ | 33,0 | 0,09 |
| | 30 | Ta$_2$O$_5$ | 5,5 | 0,01 | Ta$_2$O$_5$ | 6,0 | 0,02 | Ta$_2$O$_5$ | 15,8 | 0,04 | Ta$_2$O$_5$ | 34,0 | 0,09 |
| 20 | 32 | SiO$_2$ | 15,2 | 0,04 | SiO$_2$ | 73,0 | 0,20 | SiO$_2$ | 129,0 | 0,34 | SiO$_2$ | 21,0 | 0,06 |
| | 30 | Ta$_2$O$_5$ | 32,3 | 0,12 | Ta$_2$O$_5$ | 113,0 | 0,42 | Ta$_2$O$_5$ | 64,6 | 0,24 | Ta$_2$O$_5$ | 48,0 | 0,18 |
| σ | | | | 2,81 | | | 1,82 | | | 1,14 | | | 1,16 |
| Rm | | | | 5,44 | | | 10,59 | | | 18,41 | | | 9,75 |
| σ* Rm | | | | 15,27 | | | 19,24 | | | 20,92 | | | 11,32 |

Fig. 7

|  |  | Antiref_g | | | Antiref_bb | | | Antiref_uv | | |
|---|---|---|---|---|---|---|---|---|---|---|
|  |  | MAT | d / nm | FWOT | MAT | d / nm | FWOT | MAT | d / nm | FWOT |
| 26 | 32 | SiO$_2$ | 78,0 | 0,21 | SiO$_2$ | 103,0 | 0,28 | SiO$_2$ | 70,0 | 0,19 |
|  | 54 | Al$_2$O$_3$ | 10,0 | 0,03 | Al$_2$O$_3$ | 10,0 | 0,03 | Al$_2$O$_3$ | 13,5 | 0,04 |
|  | 30 | Ta$_2$O$_5$ | 50,0 | 0,18 | Ta$_2$O$_5$ | 39,0 | 0,14 | Ta$_2$O$_5$ | 112,0 | 0,41 |
| 24 | 32 | SiO$_2$ | 4,0 | 0,01 | SiO$_2$ | 32,0 | 0,09 | SiO$_2$ | 25,0 | 0,07 |
|  | 30 | Ta$_2$O$_5$ | 33,0 | 0,12 | Ta$_2$O$_5$ | 28,5 | 0,11 | Ta$_2$O$_5$ | 24,0 | 0,09 |
| 22 | 32 | SiO$_2$ | 78,0 | 0,21 | SiO$_2$ | 84,0 | 0,22 | SiO$_2$ | 62,0 | 0,17 |
|  | 30 | Ta$_2$O$_5$ | 8,5 | 0,02 | Ta$_2$O$_5$ | 10,5 | 0,03 | Ta$_2$O$_5$ | 15,0 | 0,04 |
| 20 | 32 | SiO$_2$ | 69,0 | 0,18 | SiO$_2$ | 91,0 | 0,24 | SiO$_2$ | 50,0 | 0,13 |
|  | 30 | Ta$_2$O$_5$ | 4,5 | 0,02 | Ta$_2$O$_5$ | 6,5 | 0,02 | Ta$_2$O$_5$ | 10,0 | 0,04 |
|  | σ |  | | 0,02 |  | | 0,13 |  | | 0,17 |
|  | Rm |  | | 1,55 |  | | 1,88 |  | | 1,63 |
|  | σ * Rm |  | | 0,03 |  | | 0,25 |  | | 0,27 |

Fig. 8

|  |  | Antiref_f | | | Antiref_r | | | Antiref_go | | |
|---|---|---|---|---|---|---|---|---|---|---|
|  |  | MAT | d / nm | FWOT | MAT | d / nm | FWOT | MAT | d / nm | FWOT |
| 26 | 32 | SiO$_2$ | 72,0 | 0,19 | SiO$_2$ | 67,0 | 0,18 | SiO$_2$ | 83,0 | 0,22 |
|  | 54 | Al$_2$O$_3$ | 11,0 | 0,03 | Al$_2$O$_3$ | 10,0 | 0,03 | Al$_2$O$_3$ | 10,0 | 0,03 |
|  | 30 | Ta$_2$O$_5$ | 3,0 | 0,01 | Ta$_2$O$_5$ | 44,0 | 0,16 | Ta$_2$O$_5$ | 59,0 | 0,22 |
| 24 | 32 | SiO$_2$ | 16,8 | 0,04 | SiO$_2$ | 14,0 | 0,04 | SiO$_2$ | 28,0 | 0,07 |
|  | 30 | Ta$_2$O$_5$ | 25,0 | 0,09 | Ta$_2$O$_5$ | 40,0 | 0,15 | Ta$_2$O$_5$ | 35,0 | 0,13 |
| 22 | 32 | SiO$_2$ | 34,0 | 0,09 | SiO$_2$ | 21,0 | 0,06 | SiO$_2$ | 100,0 | 0,27 |
|  | 30 | Ta$_2$O$_5$ | 20,0 | 0,05 | Ta$_2$O$_5$ | 8,0 | 0,02 | Ta$_2$O$_5$ | 9,0 | 0,02 |
| 20 | 32 | SiO$_2$ | 42,0 | 0,11 | SiO$_2$ | 16,0 | 0,04 | SiO$_2$ | 74,0 | 0,20 |
|  | 30 | Ta$_2$O$_5$ | 8,5 | 0,03 | Ta$_2$O$_5$ | 7,0 | 0,03 | Ta$_2$O$_5$ | 14,0 | 0,05 |
|  | σ |  | | 0,41 |  | | 0,21 |  | | 0,14 |
|  | Rm |  | | 1,37 |  | | 1,93 |  | | 1,54 |
|  | σ * Rm |  | | 0,56 |  | | 0,40 |  | | 0,21 |

Fig. 9

|     |      | V_b   |      |      | V_r   |       |      | V_g   |       |      | V_go  |       |      |
|-----|------|-------|------|------|-------|-------|------|-------|-------|------|-------|-------|------|
|     |      | MAT   | d/nm | FWOT | MAT   | d/nm  | FWOT | MAT   | d/nm  | FWOT | MAT   | d/nm  | FWOT |
| 26  | 32   | SiO₂  | 133,0| 0,36 | SiO₂  | 57,0  | 0,15 | SiO₂  | 97,0  | 0,26 | SiO₂  | 49,0  | 0,13 |
|     | 54   | Al₂O₃ | 13,0 | 0,04 | Al₂O₃ | 10,0  | 0,03 | Al₂O₃ | 13,5  | 0,04 | Al₂O₃ | 15,0  | 0,05 |
|     | 30   | Ta₂O₅ | 82,0 | 0,30 | Ta₂O₅ | 90,0  | 0,33 | Ta₂O₅ | 34,0  | 0,13 | Ta₂O₅ | 81,0  | 0,30 |
| 24  | 32   | SiO₂  | 25,0 | 0,07 | SiO₂  | 123,0 | 0,33 | SiO₂  | 13,5  | 0,04 | SiO₂  | 90,0  | 0,24 |
|     | 30   | Ta₂O₅ | 20,5 | 0,08 | Ta₂O₅ | 5,5   | 0,02 | Ta₂O₅ | 77,0  | 0,28 | Ta₂O₅ | 37,0  | 0,14 |
| 22  | 32   | SiO₂  | 37,0 | 0,10 | SiO₂  | 18,0  | 0,05 | SiO₂  | 35,0  | 0,09 | SiO₂  | 10,0  | 0,03 |
|     | 30   | Ta₂O₅ | 9,0  | 0,02 | Ta₂O₅ | 109,0 | 0,29 | Ta₂O₅ | 91,0  | 0,24 | Ta₂O₅ | 64,0  | 0,17 |
| 20  | 32   | SiO₂  | 10,0 | 0,03 | SiO₂  | 26,0  | 0,07 | SiO₂  | 14,0  | 0,04 | SiO₂  | 83,0  | 0,22 |
|     | 30   | Ta₂O₅ | 6,5  | 0,02 | Ta₂O₅ | 10,5  | 0,04 | Ta₂O₅ | 110,0 | 0,41 | Ta₂O₅ | 11,0  | 0,04 |
| σ   |      |       |      | 0,60 |       |       | 3,52 |       |       | 1,62 |       |       | 2,91 |
| Rm  |      |       |      | 6,54 |       |       | 6,93 |       |       | 5,20 |       |       | 17,14|
| σ*Rm|      |       |      | 3,93 |       |       | 24,40|       |       | 8,43 |       |       | 49,89|

Fig. 10

|  |  | Antiref_g | | | Antiref_bb | | | Antiref_uv | | |
|---|---|---|---|---|---|---|---|---|---|---|
|  |  | MAT | d / nm | FWOT | MAT | d / nm | FWOT | MAT | d / nm | FWOT |
| 28 | 32 | SiO$_2$ | 76,0 | 0,20 | SiO$_2$ | 83,8 | 0,22 | SiO$_2$ | 72,5 | 0,19 |
| | 54 | Al$_2$O$_3$ | 10,0 | 0,03 | Al$_2$O$_3$ | 10,0 | 0,03 | Al$_2$O$_3$ | 10,0 | 0,03 |
| | 30 | Ta$_2$O$_5$ | 136,0 | 0,50 | Ta$_2$O$_5$ | 123,1 | 0,45 | Ta$_2$O$_5$ | 132,9 | 0,49 |
| 26 | 32 | SiO$_2$ | 44,0 | 0,12 | SiO$_2$ | 40,6 | 0,11 | SiO$_2$ | 29,8 | 0,08 |
| | 30 | Ta$_2$O$_5$ | 29,0 | 0,08 | Ta$_2$O$_5$ | 35,0 | 0,09 | Ta$_2$O$_5$ | 26,4 | 0,07 |
| 24 | 32 | SiO$_2$ | 56,0 | 0,15 | SiO$_2$ | 40,6 | 0,11 | SiO$_2$ | 33,2 | 0,09 |
| | 30 | Ta$_2$O$_5$ | 20,8 | 0,06 | Ta$_2$O$_5$ | 21,9 | 0,06 | Ta$_2$O$_5$ | 21,6 | 0,06 |
| 22 | 32 | SiO$_2$ | 14,0 | 0,04 | SiO$_2$ | 4,4 | 0,01 | SiO$_2$ | 13,5 | 0,04 |
| | 30 | Ta$_2$O$_5$ | 8,0 | 0,02 | Ta$_2$O$_5$ | 11,5 | 0,03 | Ta$_2$O$_5$ | 4,0 | 0,01 |
| 20 | 32 | SiO$_2$ | 42,0 | 0,11 | SiO$_2$ | 28,4 | 0,08 | SiO$_2$ | 23,9 | 0,06 |
| | 30 | Ta$_2$O$_5$ | 15,0 | 0,06 | Ta$_2$O$_5$ | 21,5 | 0,08 | Ta$_2$O$_5$ | 15,1 | 0,06 |
| σ | | | | 0,13 | | | 0,18 | | | 0,22 |
| Rm | | | | 0,84 | | | 1,61 | | | 1,24 |
| σ* Rm | | | | 0,11 | | | 0,29 | | | 0,27 |

Fig. 11

|  |  | Antiref_f | | | Antiref_r | | | Antiref_go | | |
|---|---|---|---|---|---|---|---|---|---|---|
|  |  | MAT | d / nm | FWOT | MAT | d / nm | FWOT | MAT | d / nm | FWOT |
| 28 | 32 | SiO$_2$ | 75,5 | 0,20 | SiO$_2$ | 80,3 | 0,21 | SiO$_2$ | 75,5 | 0,20 |
| | 54 | Al$_2$O$_3$ | 10,0 | 0,03 | Al$_2$O$_3$ | 10,0 | 0,03 | Al$_2$O$_3$ | 10,0 | 0,03 |
| | 30 | Ta$_2$O$_5$ | 134,3 | 0,50 | Ta$_2$O$_5$ | 145,6 | 0,54 | Ta$_2$O$_5$ | 142,7 | 0,53 |
| 26 | 32 | SiO$_2$ | 35,0 | 0,09 | SiO$_2$ | 35,7 | 0,10 | SiO$_2$ | 35,0 | 0,09 |
| | 30 | Ta$_2$O$_5$ | 25,4 | 0,07 | Ta$_2$O$_5$ | 25,9 | 0,07 | Ta$_2$O$_5$ | 25,4 | 0,07 |
| 24 | 32 | SiO$_2$ | 60,0 | 0,16 | SiO$_2$ | 61,2 | 0,16 | SiO$_2$ | 60,0 | 0,16 |
| | 30 | Ta$_2$O$_5$ | 16,1 | 0,04 | Ta$_2$O$_5$ | 16,5 | 0,04 | Ta$_2$O$_5$ | 16,1 | 0,04 |
| 22 | 32 | SiO$_2$ | 27,2 | 0,07 | SiO$_2$ | 27,7 | 0,07 | SiO$_2$ | 27,2 | 0,07 |
| | 30 | Ta$_2$O$_5$ | 5,1 | 0,01 | Ta$_2$O$_5$ | 8,2 | 0,02 | Ta$_2$O$_5$ | 5,1 | 0,01 |
| 20 | 32 | SiO$_2$ | 31,8 | 0,09 | SiO$_2$ | 33,2 | 0,09 | SiO$_2$ | 31,9 | 0,09 |
| | 30 | Ta$_2$O$_5$ | 10,8 | 0,04 | Ta$_2$O$_5$ | 12,8 | 0,05 | Ta$_2$O$_5$ | 10,8 | 0,04 |
| σ | | | | 0,14 | | | 0,15 | | | 0,14 |
| Rm | | | | 0,72 | | | 0,80 | | | 0,78 |
| σ* Rm | | | | 0,10 | | | 0,12 | | | 0,11 |

Fig. 12

|  |  | V_b | | | V_r | | | V_g | | | V_go | | |
|---|---|---|---|---|---|---|---|---|---|---|---|---|---|
|  |  | MAT | d / nm | FWOT | MAT | d / nm | FWOT | MAT | d / nm | FWOT | MAT | d / nm | FWOT |
| 28 | 32 | SiO₂ | 108,0 | 0,29 | SiO₂ | 90,1 | 0,24 | SiO₂ | 121,1 | 0,32 | SiO₂ | 78,0 | 0,21 |
|  | 54 | Al₂O₃ | 10,0 | 0,03 | Al₂O₃ | 10,0 | 0,03 | Al₂O₃ | 10,0 | 0,03 | Al₂O₃ | 10,0 | 0,03 |
|  | 30 | Ta₂O₅ | 192,1 | 0,71 | Ta₂O₅ | 35,6 | 0,13 | Ta₂O₅ | 95,1 | 0,35 | Ta₂O₅ | 30,8 | 0,11 |
| 26 | 32 | SiO₂ | 48,9 | 0,13 | SiO₂ | 54,5 | 0,15 | SiO₂ | 54,4 | 0,15 | SiO₂ | 47,2 | 0,13 |
|  | 30 | Ta₂O₅ | 36,3 | 0,10 | Ta₂O₅ | 21,0 | 0,06 | Ta₂O₅ | 49,1 | 0,13 | Ta₂O₅ | 18,2 | 0,05 |
| 24 | 32 | SiO₂ | 85,8 | 0,23 | SiO₂ | 202,9 | 0,54 | SiO₂ | 145,1 | 0,39 | SiO₂ | 175,7 | 0,47 |
|  | 30 | Ta₂O₅ | 23,1 | 0,06 | Ta₂O₅ | 109,6 | 0,29 | Ta₂O₅ | 17,3 | 0,05 | Ta₂O₅ | 94,9 | 0,25 |
| 22 | 32 | SiO₂ | 36,2 | 0,10 | SiO₂ | 32,1 | 0,09 | SiO₂ | 100,0 | 0,27 | SiO₂ | 27,8 | 0,07 |
|  | 30 | Ta₂O₅ | 7,4 | 0,02 | Ta₂O₅ | 14,8 | 0,04 | Ta₂O₅ | 18,7 | 0,05 | Ta₂O₅ | 12,8 | 0,03 |
| 20 | 32 | SiO₂ | 42,4 | 0,11 | SiO₂ | 36,5 | 0,10 | SiO₂ | 20,0 | 0,05 | SiO₂ | 31,6 | 0,08 |
|  | 30 | Ta₂O₅ | 14,4 | 0,05 | Ta₂O₅ | 115,7 | 0,43 | Ta₂O₅ | 31,5 | 0,12 | Ta₂O₅ | 100,2 | 0,37 |
|  | σ |  | 0,14 | |  | 2,34 | |  | 0,99 | |  | 2,35 | |
|  | Rm |  | 7,76 | |  | 8,79 | |  | 15,29 | |  | 11,55 | |
|  | σ* Rm |  | 1,06 | |  | 20,58 | |  | 15,10 | |  | 27,15 | |

Fig. 13

LAYER SYSTEM AND OPTICAL ELEMENT COMPRISING A LAYER SYSTEM

PRIOR ART

The invention relates to a layer system for setting optical characteristics of an optical element, in particular for coating spectacle lenses, and also relates to an optical element comprising such a layer system and to a method for producing such a layer system.

It is known to use coatings of the optical elements in order to influence the optical characteristics of optical elements. In this case a sequence of layers adapted to this special application or requirement is used for each form of optical coating, such as for example anti-reflection, mirroring, filter effect. These layer designs usually differ in the sequence of layers, materials used, process management and possibly in the method of coating.

WO 2013/171435 A1 discloses a spectacle lens with a coating on the front face and the rear face. In this case the front face of the spectacle lens has a coating for cutting out the UV component of light beams falling on the front face. The rear face of the spectacle lens has an anti-reflection coating, which has a weighted reflection factor of less than or equal to 7% in the UV range. Furthermore the spectacle lens has a coating for filtering the blue component of light in the wavelength range of 400 to 460 nm.

DE 101 01 017 A1 discloses an optical layer system with a reduced degree of reflection in the ultraviolet in the wavelength range between 180 nm and 370 nm. The layer system consists of multilayers in each case consisting of adjacent layers with low and high refractive characteristics. The layer closest to the substrate must not consist of magnesium fluoride, and none of the layers has a layer thickness of more than half the working wavelength in the ultraviolet range.

DISCLOSURE OF THE INVENTION

The object of the invention is to create a layer system for optical elements which makes it possible to influence the optical characteristics of an optical element by the simplest possible coating methods which are uniform for different requirements.

A further object of the invention is to create an optical element with a layer system which makes it possible to influence the optical characteristics of an optical element by the simplest possible coating methods which are uniform for different requirements.

A further object of the invention is to create a method for designing and producing such a layer system.

These objects are achieved by the features of the independent claims. Advantageous embodiments and advantages of the invention are apparent from the further claims, the description and the drawings.

The invention relates to a layer system comprising at least one stack of successive multilayers, wherein each multilayer comprises a first partial layer with a first optical thickness t1 and a second partial layer with a second optical thickness t2 which is different from the first optical thickness t1. In this case optical characteristics of the multilayer are predeterminable as a function of a parameter $\sigma$. Thus the multilayer has optical characteristics which are determined as a function of the parameter. The respective multilayers are formed as a function of a quotient $v_i$ of the optical thickness t1 respectively of a partial layer with higher refractive characteristics and an optical thickness t2 of a partial layer of the multilayer with lower refractive characteristics, wherein the index i denotes the order of the successive multilayers in the stack, wherein the partial layer with higher refractive characteristics in particular comprises a high-refractive partial layer and the partial layer with lower refractive characteristics in particular comprises a low-refractive partial layer. In this case the parameter $\sigma$ is a function of a ratio of quotients $v_i$ of the optical thickness in each case of the partial layer with higher refractive characteristics and the optical thickness of the partial layer with lower refractive characteristics.

A reflectivity Rm of the stack of multilayers can be predetermined, wherein the product of the reflectivity Rm and the parameter $\sigma$ is less than 1 for an anti-reflection and/or anti-reflective effect of the stack of multilayers, or is greater than or equal to 1 for a mirroring. In this case the index i=1 to nmax of the quotients $v_i$ denotes the order of the multilayers arranged successively or on one another with a maximum number of nmax multilayers. In the state mounted on a substrate of an optical element the index i is smaller the nearer the respective multilayer is arranged on the substrate. In other words, for example with a stack of five multilayers in the state mounted on an optical element the quotient $v_5$ is assigned to the multilayer arranged further away from the substrate.

For the application of the layer system for example to a spectacle lens the multilayer with the index nmax would be the one arranged closest to the air.

In particular the invention relates to the coating of spectacle lenses in order to influence the optical properties of the spectacle lenses in a different manner, such as for example as an anti-reflective coating or anti-reflection, for example as a filter for the blue component of the visible light (blue block), or as a mirroring.

According to the invention this is achieved by a sequence of successive multilayers, wherein each multilayer has at least a partial layer with lower refractive characteristics and a partial layer with higher refractive characteristics, in particular a low-refractive and a high-refractive partial layer. By variation of the multilayer thicknesses whilst using the same materials different effects/reflectivities can be achieved, in particular for anti-reflection and/or anti-reflective effect and mirroring. This is achieved by minimising/optimising a parameter $\sigma$. $\sigma$ in turn is a function of the layer thicknesses, or of ratios of the optical thicknesses of the partial layers of each multilayer.

In this case the reflectivity Rm, also referred to as the degree of reflection, describes the ratio of reflected to incident intensity of a light beam as an energy parameter.

According to the invention an anti-reflection and/or anti-reflective effect by the stack of multilayers is achieved for a predeterminable reflectivity Rm of the stack of multilayers, if the product of the reflectivity Rm and the parameter $\sigma$ is set to less than 1.

In this case the reflectivity Rm can be determined by the relationship set out above as the ratio of the reflected intensity to the incident intensity of the incident light beam, wherein the reflectivity Rm is advantageously averaged over the visible range of the light from 380 nm to 800 nm and is given based on 100% or as a percentage. Such a condition can be set for an optimising process of the method for producing the layer system as a boundary condition.

Furthermore a mirroring can be achieved for a predeterminable reflectivity Rm of the stack of multilayers if the product of the reflectivity Rm and the parameter $\sigma$ is set to be greater than or equal to 1. Such a condition can also be set expediently for an optimising process of the method for producing the layer system as a boundary condition.

With this type of coating it is possible to produce the most varied anti-reflection effects, mirroring in the most varied form and configuration as well as the most varied optical filters (IR block, blue block, UV protection, high level colourless anti-reflection) with the same layer sequence and the same materials. In other words, the layer structure is always the same with respect to the choice of the layer material and of the associated coating process.

A significant advantage of the layer system according to the invention is that the different types of coatings differ merely in the choice of the thickness of the individual partial layers. A layer system which is produced with such a coherent coating process, moreover simplifies the entire development, the clearance, the start-up of the apparatus, the process maintenance and the apparatus handling (equipment, adjustment, etc.). The corresponding specialist staff, when operating and also when setting/adjusting the coating equipment, only has to master one coating concept.

In this type of coating the type of use is no longer dominated by the materials used, but by the sequence of layers and consequently by the action thereon on the entire interferometric system of the optical coating.

This type of layer system can adapt optical coatings used hitherto. Moreover, due to such a platform concept for a layer system the coatings produced in this way have similar mechanical layer characteristics such as for example adhesive strength, scratch resistance, resistance to heat, climate, etc.

In an advantageous embodiment, in such a layer system the parameter σ for a stack of three or five successive multilayers can be determined from $$\sigma = \frac{v_1}{\sum_{i=2}^{nmax} v_i}$$

wherein i=1 to nmax, for nmax=3 or nmax=5, denotes the order of the multilayers in the stack, and $v_i$ results from a quotient of the optical thickness t1 of the partial layer with higher refractive characteristics relative to the optical thickness t2 of the partial layer with lower refractive characteristics of a respective multilayer. In this case the optical thickness t, or FWOT (full wave optical thickness) is determined as $$t = \frac{d}{\lambda} * n$$

wherein d represents the layer thickness, λ represents the design wavelength and n represents the index of refraction of the partial layer.

For a stack of four successive multilayers the parameter σ can be determined from $$\sigma = \frac{v_1 + v_2}{v_3 + v_4}$$

wherein the digits 1 to 4 correspond to the indices i from the examples of the stack of three or five successive multilayers and denote the order of the multilayers in the stack, and $v_i$ results from a quotient of the optical thickness t1 of the partial layer with higher refractive characteristics relative to the optical thickness t2 of the partial layer with lower refractive characteristics of a respective multilayer.

According to an advantageous embodiment, partial layers with lower refractive characteristics and partial layers with higher refractive characteristics can be arranged in the multilayers of the stack in the same order in each case. Thus in the entire layer system a partial layer with lower refractive characteristics is in each case always followed by a partial layer with higher refractive characteristics. As a result the coating process can also be advantageously standardised and streamlined.

According to a further advantageous embodiment an anti-reflection and/or anti-reflective effect by the stack of multilayers can be achieved if the parameter σ is set to less than 4, preferably less than 1, particularly preferably less than 0.3. Thus, the stack of multilayers has an anti-reflection effect when the parameter σ is less than 4. This also constitutes a possible useful boundary condition for an optimising process of the method for producing the layer system.

According to a further advantageous embodiment, a difference between the indices of refraction n1, n2 of a partial layer with higher refractive characteristics and of a partial layer with lower refractive characteristics in the same multilayer may be greater than 0.2, preferably greater than 0.3, particularly preferably greater than 0.4. Such differences of the index of refraction n1, n2 are sufficient, in the event of a number of for example three, four, or five successive multilayers in a layer system, to achieve targeted influencing of the optical properties of the layer system in a desired manner, in particular when used in the field of spectacle lenses.

According to a further advantageous embodiment the high-refractive partial layers can have a first index of refraction n1 of at least 1.6, preferably at least 1.7, particularly preferably at least 1.8, especially preferably at least 1.9, and the low-refractive partial layers have a second index of refraction n2 of at most 1.55, preferably at most 1.48, particularly preferably at most 1.4. These details of indices of refraction relate to normal conditions at a temperature of 25° C. as well as a reference wavelength of the light intensity of 550 nm used.

Typical examples for layer materials with different indices of refraction are silicon dioxide ($SiO_2$) with an index of refraction of 1.46, aluminium oxide ($Al_2O_3$) with an index of refraction of 1.7, zirconium oxide ($ZrO_2$) with an index of refraction of 2.05, praseodymium titanium oxide ($PrTiO_3$) with an index of refraction of 2.1, titanium oxide ($TiO_2$) and zinc sulfide (ZnS) in each case with an index of refraction of 2.3. These values constitute mean values, which can vary by up to 10% depending upon the coating process and layer thickness.

Conventional optical lenses have indices of refraction between 1.5 and 2.0. Layer materials with indices of refraction less than 1.5 such as $MgF_2$, $SiO_2$, $Al_2O_3$ in combination with optical lenses are therefore designated as low-refractive materials, and layer materials with indices of refraction greater than 2.0 such as $ZrO_2$, $PrTiO_3$, $TiO_2$, ZnS in combination with optical lenses are designated as high-refractive materials. Consequently the difference in the index of refraction between high-refractive and low-refractive materials is at least 0.2 to at least 0.5 depending upon the coating process and the layer thickness.

According to a further advantageous embodiment the respective last multilayer of the stack of multilayers can have a functional layer between the two partial layers. This functional layer can for example improve an antistatic effect by increasing the electrical conductivity, can produce elastic equalisation of stresses or can also be used as a diffusion barrier.

According to a further advantageous embodiment, within the stack of multilayers the partial layers with lower refractive characteristics can be formed from similar material, and/or within the stack of multilayers the partial layers with higher refractive characteristics can be formed from similar material. As a result it is possible to produce the layer system with two materials as coating materials, which greatly simplifies and consequently also accelerates the development and production of the layer system both from the point of view of the apparatus and also from the point of view of the operator.

According to a further advantageous embodiment the partial layers with higher refractive characteristics can include at least one of the materials $Ta_2O_5$, $TiO_2$, $ZrO_2$, $Al_2O_3$, $Nd_2O_5$, $Pr_2O_3$, $PrTiO_3$, $La_2O_3$, $Nb_2O_5$, $Y_2O_3$, $HfO_2$, ITO (indium tin oxide), $Si_3N_4$, MgO, $CeO_2$ and modifications thereof, in particular the other oxidation stages thereof. These materials are known as materials with a high conventional index of refraction for use in optical elements, such as for example for coating spectacle lenses. However, the partial layers with higher refractive characteristics can also contain $SiO_2$ or other materials with lower refractive characteristics, so long as the index of refraction of the entire partial layer is greater than 1.6.

According to a further advantageous embodiment the partial layers with lower refractive characteristics can include at least one of the materials SiO, $SiO_2$, silanes, siloxanes. However, the partial layers with lower refractive characteristics can also contain a mixture of $SiO_2$ and $Al_2O_3$. The partial layers with lower refractive characteristics can preferably contain at least 80% by weight $SiO_2$, particularly preferably at least 90% by weight $SiO_2$.

The materials used for this type of coatings are the typical materials which in the field of optics are applied by means of for example PVD processes (PVD=physical vapour deposition) or CVD processes (CVD=chemical vapour deposition). This means that $SiO_2$ and mixtures with $SiO_2$ are preferred as the material with lower refractive characteristics. All typical high-refractive oxidic materials and mixtures thereof are possible as the high-refractive material ($Ta_2O_5$, $Ti_xO_y$, $ZrO_2$, etc.). The choice of a specific material composition, such as was to some extent necessary in coatings in the past, is no longer provided in the layer system according to the invention.

Thus all typical high-refractive metal oxides and mixtures thereof in the optical industry ($Ta_2O5$, $Ti_xO_y$, $ZrO_2$, and the like) can be used as the materials with higher refractive characteristics.

All typical low-refractive metal oxides and mixtures thereof in the optical industry (SiO, $SiO_2$; $SiO_2$ with additions of Al, SiO and also silanes and siloxanes in pure form or with fluorinated derivatives thereof, and the like) can be used as the materials with lower refractive characteristics.

According to a further aspect the invention relates to an optical element, in particular an ophthalmic lens or a spectacle lens comprising at least one layer system with a stack of successive multilayers, wherein each multilayer comprises a first partial layer with a first optical thickness and a second partial layer with a second optical thickness, wherein the layer system is arranged on a surface of a substrate. The entire layer system can be applied to an optically transparent substrate directly or also to a substrate coated with a hard layer. Before the application of the layer system the described surfaces can be conditioned by means of plasma. Different gases, such as Ar, $O_2$, $N_2$, and the like can be added to the plasma. The conditioning can constitute an activation, but also a functionalisation of the surface to be coated, such as compaction.

The described plasma conditioning can also be applied to the outermost partial layer furthest away from the substrate.

In an advantageous embodiment, in the optical element the lower one of the partial layers towards the substrate can have higher refractive characteristics than the other one of the partial layers. Thus the order of the partial layers of the individual multilayers of the layer system is defined, since the partial layers with higher refractive characteristics and with lower refractive characteristics are in each case arranged alternately in the layer system.

The described coatings can be applied to the substrate to be coated on both sides or also only on one side, so that according to a further advantageous embodiment a layer system can be provided in each case on two opposite surfaces of the substrate.

According to another advantageous embodiment the layer systems provided on two opposite surfaces of the substrate may have a different number of multilayers. One of the two layer systems can also have an additional functional layer on the uppermost multilayer, whilst the other one of the two layer systems does not.

According to a further advantageous embodiment the at least one surface of the substrate can be coated with a hard layer. This hard layer can be designed as an organic varnish layer or also as an inorganic layer such as for example $SiO_2$, optionally with possible additives.

According to a further aspect the invention relates to a method for producing a layer system, wherein optical characteristics of the layer system are set in that the respective multilayers are formed as a function of a quotient $v_i$ of a first optical thickness t1 respectively of a first partial layer with higher refractive characteristics and a second optical thickness t2 of a second partial layer of the multilayer with lower refractive characteristics, wherein the index i denotes the order of the successive multilayers in the stack. In this case a parameter σ is a function of a ratio of the quotients $v_i$. In this case a reflectivity Rm of the stack of multilayers can be predetermined. The product of the reflectivity Rm and the parameter σ is set to be less than 1 in order to achieve an anti-reflection and/or anti-reflective effect of the stack of multilayers, or is set to be greater than or equal to 1 for a mirroring. The optical thicknesses t1, t2 of the first and second partial layers of one or more multilayers are specified in that the parameter σ is determined by means of an optimisation process, preferably by means of variational calculus. The first and second partial layers are produced thereon with the calculated parameters, in particular the optical thicknesses t1, t2 of the partial layers of the multilayers of a stack of multilayers.

The optical characteristics of the layer system can be set by a suitable choice of the parameter σ, or of the product of the reflectivity Rm*σ, as already described above. For example an anti-reflection and/or anti-reflective effect by the stack of multilayers can be achieved if the parameter σ is set to less than 4, preferably less than 1, particularly preferably less than 0.3.

Furthermore an anti-reflection/anti-reflective effect by the stack of multilayers can be achieved for a predeterminable reflectivity Rm of the stack of multilayers, if the product of the reflectivity Rm and the parameter σ is set to less than 1. Alternatively a mirroring can be achieved for a predeterminable reflectivity Rm of the stack of multilayers if the product of the reflectivity Rm and the parameter σ is set to be greater than or equal to 1.

Advantageously the layer thicknesses of the partial layers with higher refractive characteristics can be set between 2 and 150 nm, and also the optical thicknesses t1 can be set between 0.01 and 0.55. Furthermore the layer thicknesses of the partial layers with lower refractive characteristics can be set between 2 and 200 nm, and also the optical thicknesses t2 can be set between 0.01 and 0.53. These minimum values and maximum values for the layer thicknesses and/or the optically thicknesses t1, t2 of the partial layers advantageously form limiting values of the optimisation process.

In this case the parameter σ is optimised by means of a variation of the optical thicknesses of the individual partial layers to such an extent that the parameter σ is in the desired range. This variation can be achieved by means of non-linear optimisation processes, wherein one of the possible methods is variational calculus. However, other methods of local or global non-linear optimisation are also conceivable, for example evolutionary algorithms, cluster analysis, or neural networks. In this case an iterative procedure is also conceivable such that measurement results of produced layer systems are in turn included in the parameters of a new optimisation calculation in order thus to achieve more reliable results. For the optimisation for example commercially available optimisation/calculation processes for example from Thin Film Center Inc. (software package Essential Macleod) or Filmstar can be used.

DRAWINGS

Further advantages are apparent from the following description of the drawings. Embodiments of the invention are illustrated in the drawings. The drawings, the description and the claims contain numerous features in combination. The person skilled in the art will also advantageously consider the features individually and produce further sensible combinations thereof.

In the drawings, by way of example:

FIG. 5 shows parameters of a layer system according to an exemplary embodiment of the invention with three multilayers for applications as anti-reflective green, anti-reflective blue block and anti-reflective UV coating;

FIG. 6 shows parameters of a layer system according to an exemplary embodiment of the invention with three multilayers for applications as anti-reflective colourless, anti-reflective red and anti-reflective gold coating;

FIG. 7 shows parameters of a layer system according to an exemplary embodiment of the invention with three multilayers for applications as blue mirroring, red mirroring, green mirroring and gold mirroring;

FIG. 8 shows parameters of a layer system according to a further exemplary embodiment of the invention with four multilayers for applications as anti-reflective green, anti-reflective blue block and anti-reflective UV coating;

FIG. 9 shows parameters of a layer system according to a further exemplary embodiment of the invention with four multilayers for applications as anti-reflective colourless, anti-reflective red and anti-reflective gold coating;

FIG. 10 shows parameters of a layer system according to a further exemplary embodiment of the invention with four multilayers for applications as blue mirroring, red mirroring, green mirroring and gold mirroring;

FIG. 11 shows parameters of a layer system according to another exemplary embodiment of the invention with five multilayers for applications as anti-reflective green, anti-reflective blue block and anti-reflective UV coating;

FIG. 12 shows parameters of a layer system according to an exemplary embodiment of the invention with five multilayers for applications as anti-reflective colourless, anti-reflective red and anti-reflective gold coating;

FIG. 13 shows parameters of a layer system according to another exemplary embodiment of the invention with five multilayers for applications as blue mirroring, red mirroring, green mirroring and gold mirroring;

EMBODIMENTS OF THE INVENTION

Figure 1:
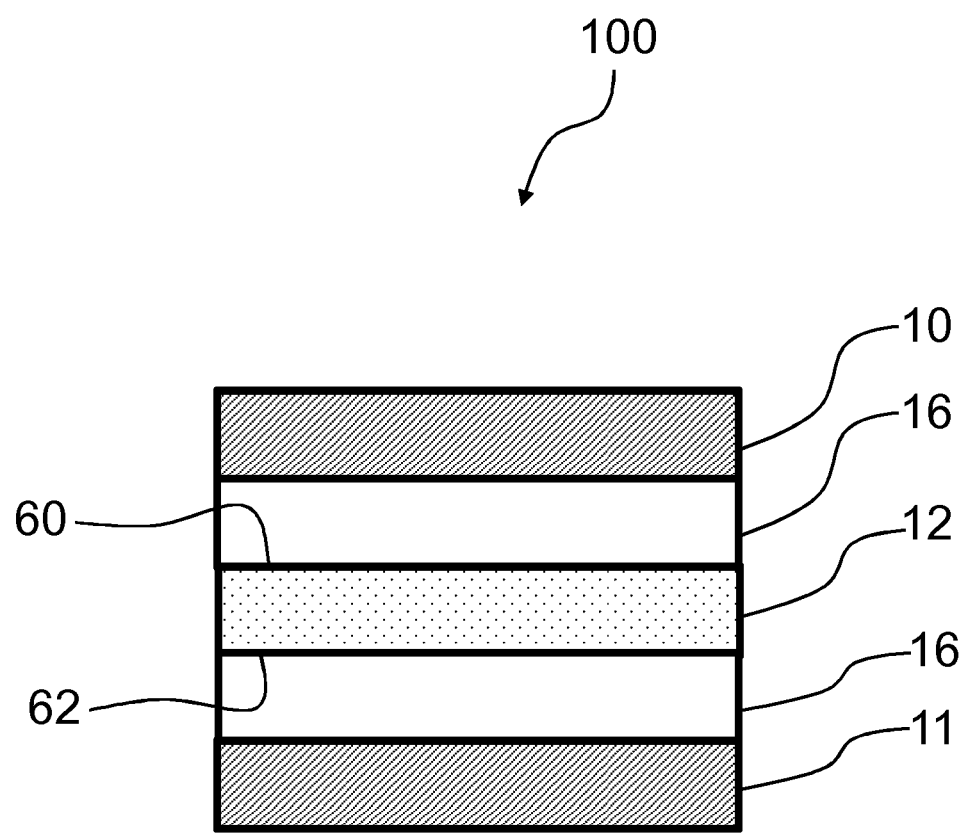
FIG. 1 shows an optical element according to an exemplary embodiment of the invention with layer systems arranged on both surfaces of a substrate.

In the drawings similar or equivalent components are provided with the same reference signs. The drawings show only examples and should not be understood as limiting.

FIG. 1 shows an optical element 100 according to an exemplary embodiment of the invention with layer systems 10, 11 arranged on both surfaces 60, 62 of a substrate 12. In the illustrated exemplary embodiment the substrate 12 is coated on each of the two surfaces 60, 62 with a hard layer 16, on which in each case a layer system 10, 11 is applied. This hard layer 16 can be designed as an organic varnish layer or also as an inorganic layer such as for example $SiO_2$, optionally also with possible additives.

Before the application of the layer system 10, 11 the surfaces 60, 62 can be conditioned by means of a plasma treatment. Different gases, such as Ar, $O_2$, $N_2$, or the like can be added to the plasma. The conditioning can constitute an activation, but also a functionalisation of the surface to be coated, for example for the purpose of compression. The uppermost partial layer of the layer system 10, 11 can also be subjected to such a plasma conditioning.

The two layer systems 10, 11 can also have different structures, in that they have a different number of multilayers. One of the two layer systems 10, 11 can also have an additional functional layer on the uppermost multilayer, whilst the other one of the two layer systems 10, 11 does not.

Figure 2:
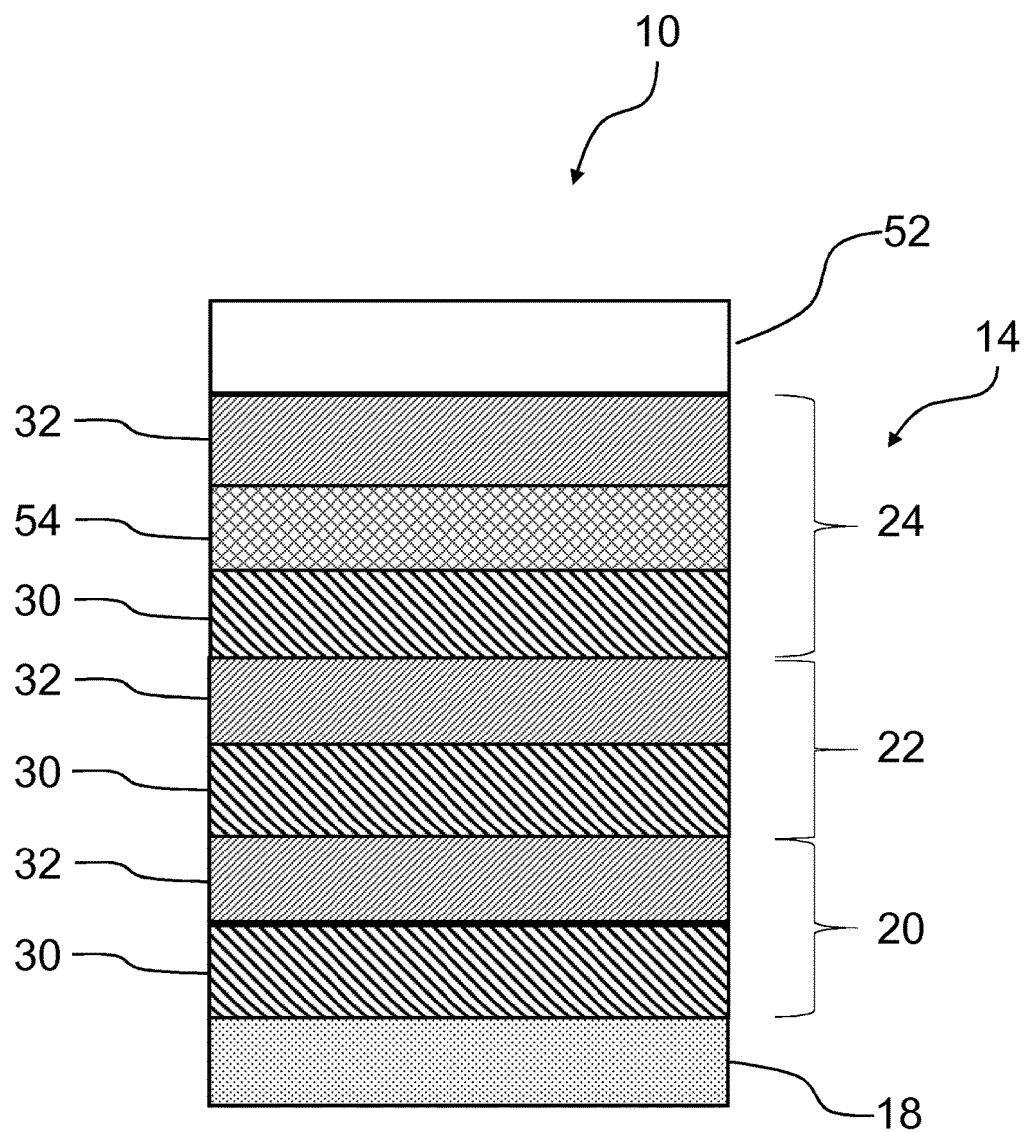
FIG. 2 shows a layer system according to an exemplary embodiment of the invention with three multilayers.

In this connection FIG. 2 shows a layer system 10 according to an exemplary embodiment of the invention with three multilayers 20, 22, 24. The layer system 10 has an adhesion-improving layer 18 as the lowest layer for better adhesion directly on the substrate 12 or on the hard layer 16 applied to the substrate 12. This adhesion-improving layer 18 can for example consist of substoichiometric low-refractive metal oxides, chromium, silanes and also siloxanes.

Then the respective multilayers 20, 22, 24 are successively arranged thereon, wherein the multilayers 20, 22 in each case consist of a partial layer 30 with higher refractive characteristics, followed by a partial layer 32 with lower refractive characteristics. The lower one of the partial layers 30 towards the substrate 12 has higher refractive characteristics than the other one of the partial layers 32. Between the partial layer 30 with higher refractive characteristics and the partial layer 32 with lower refractive characteristics the uppermost multilayer 24 also has a functional layer 54 which for example can act to increase the electrical conductivity, to equalise stresses, or as a diffusion barrier. This optically relevant functional layer 54 can be made up of a low-refractive material, and can also be alloyed with other metal oxides such as for example aluminium.

A functional layer 52 is also arranged on the uppermost multilayer 24. The functional layer 52 is applied to the last optically relevant partial layer 32 of the multilayer 24 and can contain fluorine-containing molecules. The function of this functional layer 52 usually constitutes an improved maintenance characteristic, with characteristics such as a water-repellent and oil-repellent function with a surface energy of typically less than 15 mN/m.

The to a method for producing the layer system 10, in which optical characteristics of the layer system 10 are set, is based on the fact that the respective multilayers 20, 22, 24 are formed as a function of a quotient $v_1$, $v_2$, $v_3$ of a first optical thickness t1 respectively of a first partial layer 30 with higher refractive characteristics and a second optical thickness t2 of a second partial layer 32 of the multilayer 20, 22, 24 with lower refractive characteristics, and a parameter $\sigma$ is a function of a ratio of the quotients $v_1$, $v_2$, $v_3$. The optical thicknesses t1, t2 of the first and second partial layers 30, 32 of one or more multilayers 20, 22, 24 are specified in that the parameter $\sigma$ is determined by means of an optimisation process, preferably by means of variational calculus, and the first and second partial layers 30, 32 are produced with the calculated parameters, in particular the optical thicknesses t1, t2 of the partial layers 30, 32 of the multilayers 20, 22, 24 of a stack 14 of multilayers 20, 22, 24. In a similar manner layer systems 10 can be produced with four or five multilayers 20, 22, 24, 26, 28 by means of variation of the parameter $\sigma$.

Figure 3:
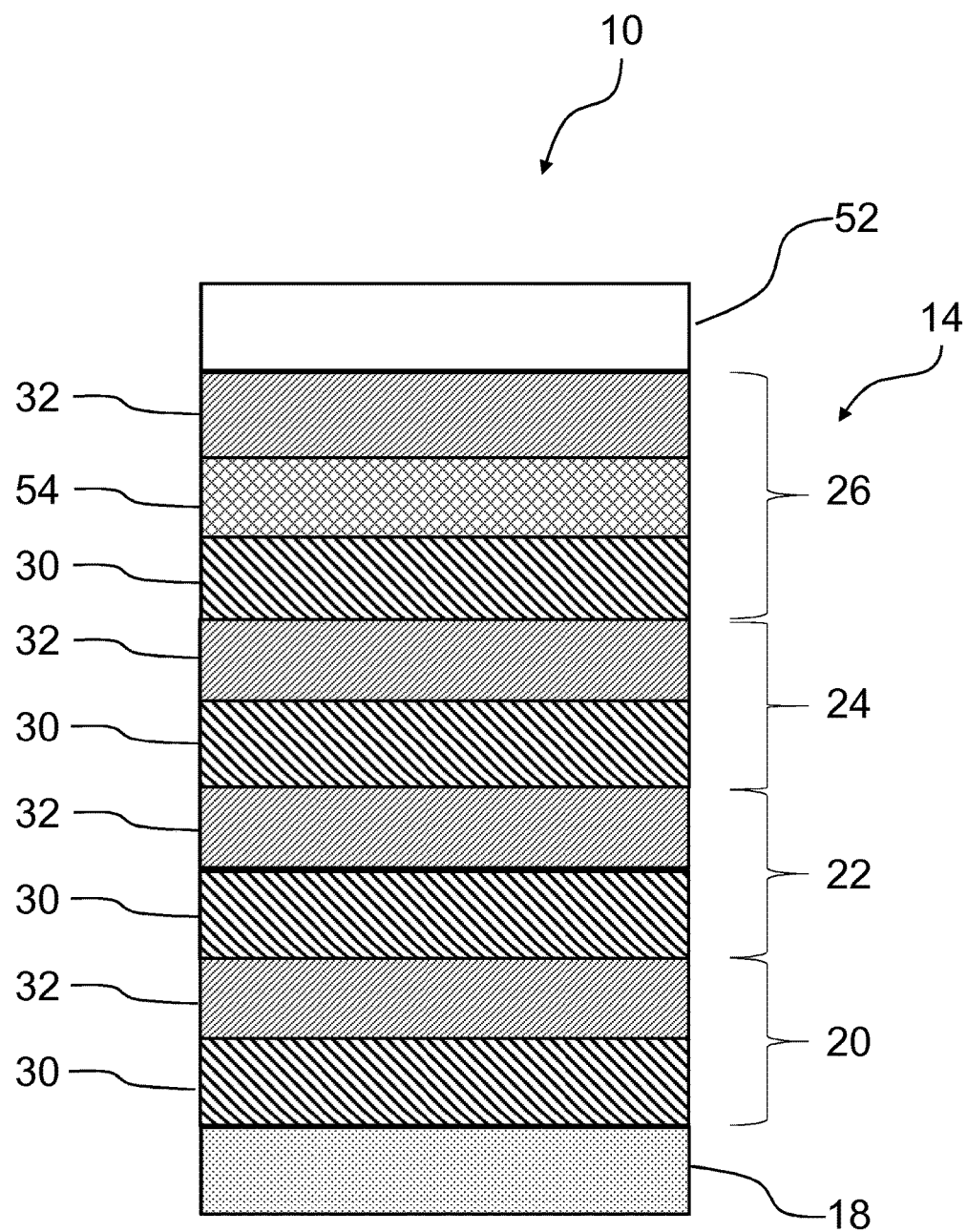
FIG. 3 shows a layer system according to a further exemplary embodiment of the invention with four multilayers.

FIG. 3 shows a layer system 10 similar to that in FIG. 2 according to a further exemplary embodiment of the invention with four multilayers 20, 22, 24, 26. It contains a further multilayer 26. In this exemplary embodiment the functional layer 54 is built into the multilayer 26, since this latter constitutes the outermost multilayer of the layer system 10. The further functional layer 52 is applied to the last partial layer 32 of the outermost multilayer 26.

Figure 4:
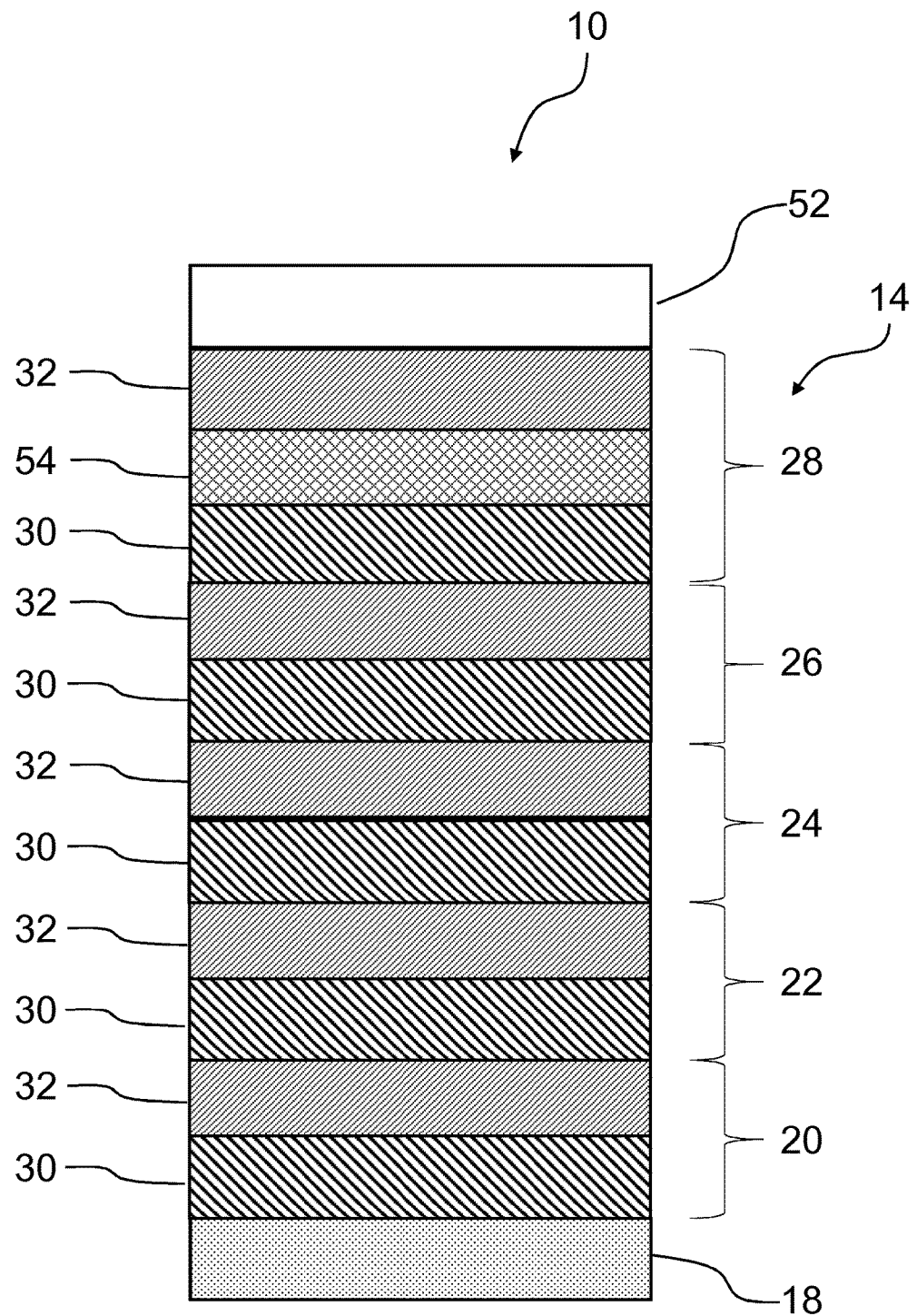
FIG. 4 shows a layer system according to another exemplary embodiment of the invention with five multilayers.

FIG. 4 shows a further layer system 10 according to another exemplary embodiment of the invention with five multilayers 20, 22, 24, 26, 28. In this exemplary embodiment the functional layer 54 is built into the multilayer 28, since this latter constitutes the outermost multilayer of the layer system 10. The further functional layer 52 is applied to the last partial layer 32 of the outermost multilayer 28.

In FIG. 5 parameters of a layer system 10 according to an exemplary embodiment of the invention with three multilayers 20, 22, 24 are listed for applications with Antiref_g for an anti-reflective green coating, Antiref_bb for an anti-reflective blue block coating and Antiref_uv for an anti-reflective UV coating. The parameter d denotes the thickness and the parameter MAT denotes the layer material.

The multilayers 20, 22, 24 are in each case made up of partial layers 30 with the similar material $Ta_2O_5$ and partial layers 32 with the similar material $SiO_2$. The uppermost multilayer 24 has a functional layer 54 with $Al_2O_3$ between the two partial layers 30, 32. In this case $Ta_2O_5$ typically has an index of refraction of 2.03, $SiO_2$ typically has, depending upon the packing density, an index of refraction of 1.46 to 1.62, $Al_2O_3$ typically has an index of refraction of 1.67. Consequently, the difference in the indices of refraction between the partial layer with higher refractive characteristics and the partial layer with lower refractive characteristics is between 0.2 and 0.5.

The index of refraction of for example $Ta_2O_5$ and $TiO_2$ can be set for example by means of plasma support in specific ranges. For example for $Ta_2O_5$ the index of refraction can be set in this way between for instance 1.95 and 2.15. The same applies for $TiO_2$.

The layer system 10 shown in FIG. 5 has a stack 14 of successive multilayers 20, 22, 24, wherein each multilayer 20, 22, 24 comprises a first partial layer 30 with a first optical thickness t1 and a second partial layer 32 with a second optical thickness t2 that is different from the first optical thickness t1. Optical characteristics of the multilayer 20, 22, 24 are predeterminable as a function of the parameter $\sigma$. The respective multilayers 20, 22, 24 are formed as a function of a quotient $v_1$, $v_2$, $v_3$ of the optical thickness t1 respectively of a partial layer 30 with higher refractive characteristics and an optical thickness t2 of the partial layer 32 of the multilayer 20, 22, 24 with lower refractive characteristics. The partial layer 30 with higher refractive characteristics comprises in particular a high-refractive partial layer 30, which in the exemplary embodiment in FIG. 5 is $Ta_2O_5$, and the partial layer 32 with lower refractive characteristics comprises in particular a low-refractive partial layer 32, which in the exemplary embodiment in FIG. 5 is $SiO_2$. The parameter $\sigma$ is a function of a ratio of the quotients $v_1$, $v_2$, $v_3$. The optical thicknesses t1, t2 are listed in FIG. 5 in the column FWOT in each case for the partial layers 30, 32. In addition the physical thicknesses are also shown in nm. Partial layers 32 with lower refractive characteristics and partial layers 30 with higher refractive characteristics are arranged in the multilayers 20, 22, 24 of the stack 14 in the same order in each case.

The parameter $\sigma$ for a stack 14 of three successive multilayers 20, 22, 24 in FIG. 5 is $\sigma$ according to the formula $$\sigma = \frac{v_1}{\sum_{i=2}^{nmax} v_i}$$

with i=1 to nmax, for nmax=3, which denotes the order of the multilayers in the stack, $$\sigma = \frac{v_1}{v_2 + v_3}$$

$v_1$, $v_2$, $v_3$ result from a quotient of the optical thickness t1 of the partial layer 30 with higher refractive characteristics relative to the optical thickness t2 of the partial layer 32 of the multilayer 20, 22, 24 with lower refractive characteristics, wherein $v_1$ is associated with the multilayer 20 lying nearest to the substrate, $v_2$ is associated with the central multilayer 22 and $v_3$ is associated with the outermost multilayer 24. A reflectivity Rm of the stack 14 of multilayers 20, 22, 24 can be predetermined. In this case an anti-reflection/anti-reflective effect by the stack 14 of multilayers 20, 22, 24 can be achieved if the product of the reflectivity Rm and the parameter σ is set to less than 1. In this case the reflectivity Rm is averaged in the visible range between 380 nm and 800 nm. A mirroring can be achieved if the product of the reflectivity Rm and the parameter σ is set to be greater than or equal to 1. An anti-reflection and/or anti-reflective effect by the stack 14 of multilayers 20, 22, 24 can also be achieved if the parameter σ is set to less than 4, preferably less than 1, particularly preferably less than 0.3.

FIG. 6 shows the parameters of the layer system 10 according to the exemplary embodiment of the invention for a stack 14 with three multilayers 20, 22, 24 for applications with Antiref_f for an antireflective colourless coating, with Antiref_r for an anti-reflective red coating, and with Antiref_go for an anti-reflective gold coating, and FIG. 7 relates to applications of coatings with V_b for a blue mirroring, V_r for a red mirroring, V_g green mirroring and V_go for a gold mirroring. The parameter d denotes the thickness and the parameter MAT denotes the layer material. In this case it can be recognised that a mirroring is achieved with a product of reflectivity Rm and the parameter σ, that is to say σ*Rm, of greater than 1, which in terms of order of magnitude have values between 11 and 21 in the described exemplary embodiment. For σ*Rm values of less than 1, on the other hand, an anti-reflection/anti-reflective effect is achieved. In the anti-reflective layer systems σ has values less than or equal to 0.31.

FIG. 8 shows the corresponding parameters of a layer system 10 according to a further exemplary embodiment of the invention for a stack 14 with four multilayers 20, 22, 24, 26, which are made up of the respective similar partial layers 30 of $Ta_2O_5$ and partial layers 32 of $SiO_2$, for applications with Antiref_g for an anti-reflective green coating, Antiref_bb for an anti-reflective blue block coating and Antiref_uv for an anti-reflective UV coating. The parameter d denotes the thickness and the parameter MAT denotes the layer material. Here too the uppermost multilayer 26 has a functional layer 54 of $Al_2O_3$ between the partial layers 30 and 32.

The parameter σ for the four multilayers 20, 22, 24, 26 in FIG. 8 is $$\sigma = \frac{v_1 + v_2}{v_3 + v_4}$$

$v_1$, $v_2$, $v_3$, $v_4$ result from a quotient of the optical thickness t1 of the partial layer 30 with higher refractive characteristics relative to the optical thickness t2 of the partial layer 32 with lower refractive characteristics of a respective multilayer 20, 22, 24, 26, wherein $v_1$ is associated with the multilayer 20, $v_2$ is associated with the multilayer 22, $v_3$ is associated with the multilayer 24 and $v_4$ is associated with the multilayer 26.

FIG. 9 shows the parameters of the layer system 10 according to the exemplary embodiment with four multilayers 20, 22, 24, 26 for applications with Antiref_f for an anti-reflective colourless coating, Antiref_r for an anti-reflective red coating, and Antiref_go for an anti-reflective gold coating. The parameter d denotes the thickness and the parameter MAT denotes the layer material.

FIG. 10 shows the parameters of the layer system 10 according to the exemplary embodiment with four multilayers 20, 22, 24, 26 for applications with V_b for a blue mirroring, V_r for a red mirroring, V_g for a green mirroring and V_go for a gold mirroring. The parameter d denotes the thickness and the parameter MAT denotes the layer material. Here too it can be recognised that a mirroring is achieved with a product of reflectivity Rm and the parameter σ, that is to say σ*Rm, of greater than 1, which in terms of order of magnitude have values between 4 and 50 in the described exemplary embodiment. For σ*Rm values of less than 1, on the other hand, an anti-reflection/anti-reflective effect is achieved. In the anti-reflective layer systems σ has values less than or equal to 0.41.

FIG. 11 shows corresponding parameters of a layer system 10 according to another exemplary embodiment of the invention for a stack 14 with five multilayers 20, 22, 24, 26, 28, which are made up of the respective similar partial layers 30 of $Ta_2O_5$ and partial layers 32 of $SiO_2$, for applications with Antiref_g for an anti-reflective green coating, Antiref_bb for an anti-reflective blue block coating and Antiref_f_uv for an anti-reflective UV coating. The parameter d denotes the thickness and the parameter MAT denotes the layer material. Here too the uppermost multilayer 28 has a functional layer 54 of $Al_2O_3$ between the partial layers 30 and 32.

The parameter σ for five multilayers 20, 22, 24, 26, 28 in FIG. 11 is σ according to the formula $$\sigma = \frac{v_1}{\sum_{i=2}^{nmax} v_i}$$

with i=1 to nmax, for nmax=5, which denotes the order of the multilayers in the stack, $$\sigma = \frac{v_1}{v_2 + v_3 + v_4 + v_5 5}$$

$v_1$, $v_2$, $v_3$, $v_4$, $v_5$ result from a quotient of the optical thickness t1 of the partial layer 30 with higher refractive characteristics relative to the optical thickness t2 of the partial layer 32 with lower refractive characteristics of a respective multilayer 20, 22, 24, 26, 28, wherein $v_1$ is associated with the multilayer 20, $v_2$ is associated with the multilayer 22, $v_3$ is associated with the multilayer 24, $v_4$ is associated with the multilayer 26 and $v_5$ is associated with the multilayer 28.

FIG. 12 shows the parameters of the layer system 10 with five multilayers 20, 22, 24, 25, 28 for applications with Antiref_f for an anti reflective colourless coating, Antiref_r for an anti-reflective red coating, and with Antiref_go for an anti-reflective gold coating, and FIG. 13 relates to applications with V_b for a blue mirroring, V_r for a red mirroring, V_g for a green mirroring and V_go for a gold mirroring. The parameter d denotes the thickness and the parameter MAT denotes the layer material.

Here too it can be recognised that a mirroring is achieved with a product of reflectivity Rm and the parameter σ, that is to say σ*Rm, of greater than 1, which in terms of order of magnitude have values between 1.06 and 27 in the described exemplary embodiment. For the product σ*Rm of less than 1, on the other hand, an anti-reflection/anti-reflective effect is achieved. In the anti-reflective layer systems σ has values less than or equal to 0.22. In the layer system 10 of the blue mirroring in FIG. 13 σ is also 0.14, but the product σ*Rm is 1.06, that is to say greater than 1. Thus the product σ*Rm is a sufficient condition for the layer system 10 to have the required mirroring exhibits.

Figure 14:
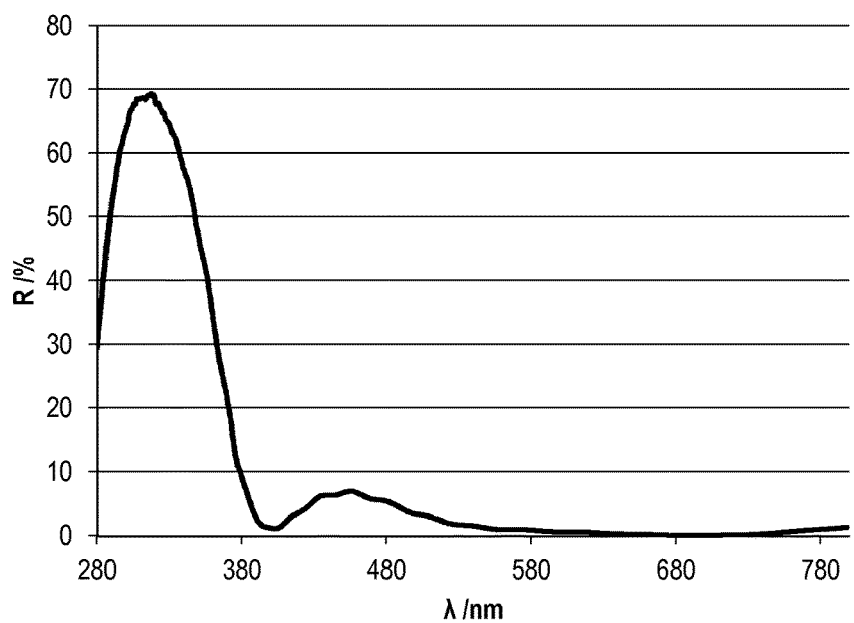
FIG. 14 shows a reflection curve of a layer system according to an exemplary embodiment of the invention with four multilayers for an application as anti-reflective blue block filter.

FIG. 14 shows a reflection curve of a layer system 10 according to an exemplary embodiment of the invention with four multilayers 20, 22, 24, 26 for an application as an anti-reflective blue block filter, wherein the reflection R in % is shown over the wavelength λ in nm. Consequently the maximum of the reflection curve is in the blue range of the spectrum at a wavelength of the light of approximately 300 nm, in order thus to minimise the transmission of the blue component of the light. Above approximately 400 nm the reflection is very low, that is to say the transmission is very high.

Figure 15:
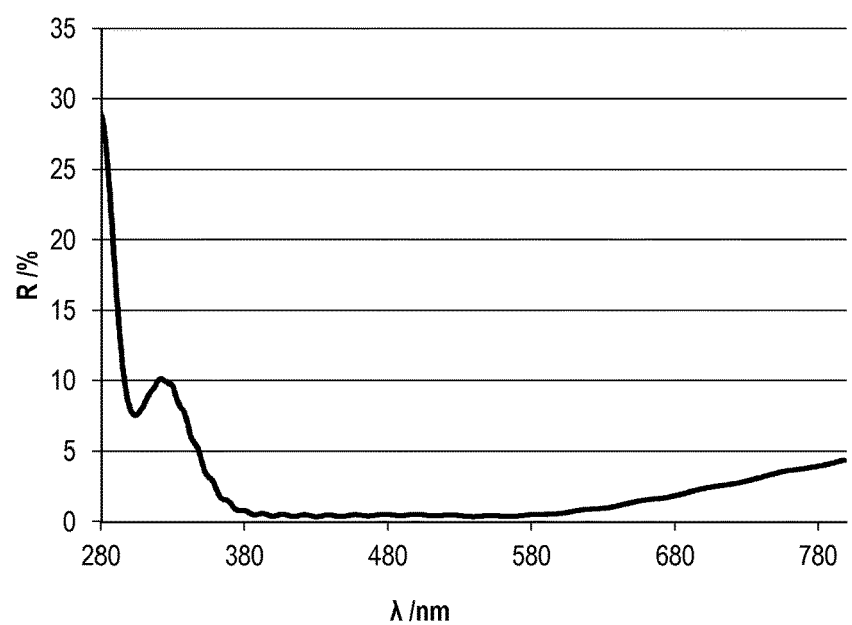
FIG. 15 shows a reflection curve of a layer system according to an exemplary embodiment of the invention with four multilayers for an application as anti-reflective colourless coating.

On the other hand, FIG. 15 shows a reflection curve of a layer system 10 according to an exemplary embodiment of the invention with four multilayers 20, 22, 24, 26 for an application as an anti-reflective colourless coating, wherein the reflection R is shown in % over the wavelength λ in nm. In this case the reflection is minimal in the wavelength range between 380 and 580 nm and then increases slowly again, but at 800 nm is still below 5%. Thus the transmission over a wide visible range of the light is very high.

Figure 16:
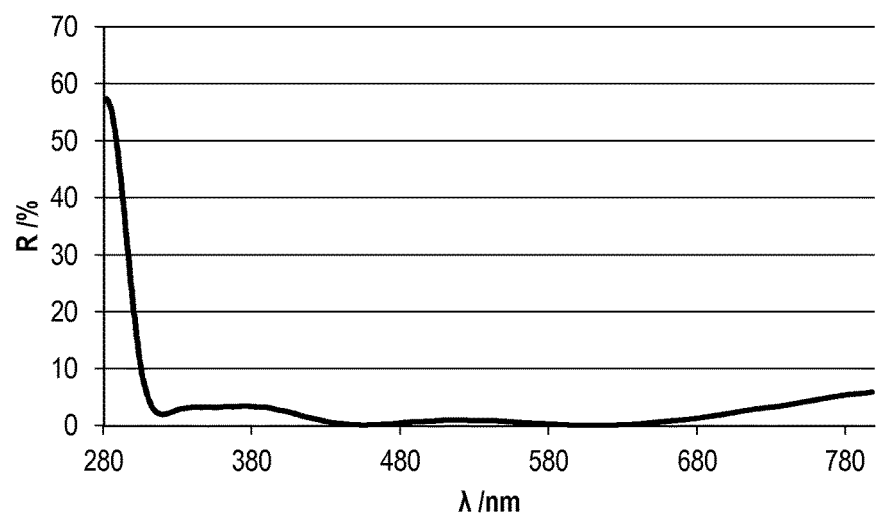
FIG. 16 shows a reflection curve of a layer system according to an exemplary embodiment of the invention with four multilayers for an application as anti-reflective UV filter.

FIG. 16 shows a reflection curve of a layer system 10 according to an exemplary embodiment of the invention with four multilayers 20, 22, 24, 26 for an application as an anti-reflective UV filter, wherein the reflection R in % is shown over the wavelength λ in nm. In this exemplary embodiment the reflection curve rises very steeply below a limit wavelength of approximately 300 nm to lower values. As a result this UV component of the light is effectively blocked, whilst the visible range has a very high transmission of up to 95%.

Figure 17:
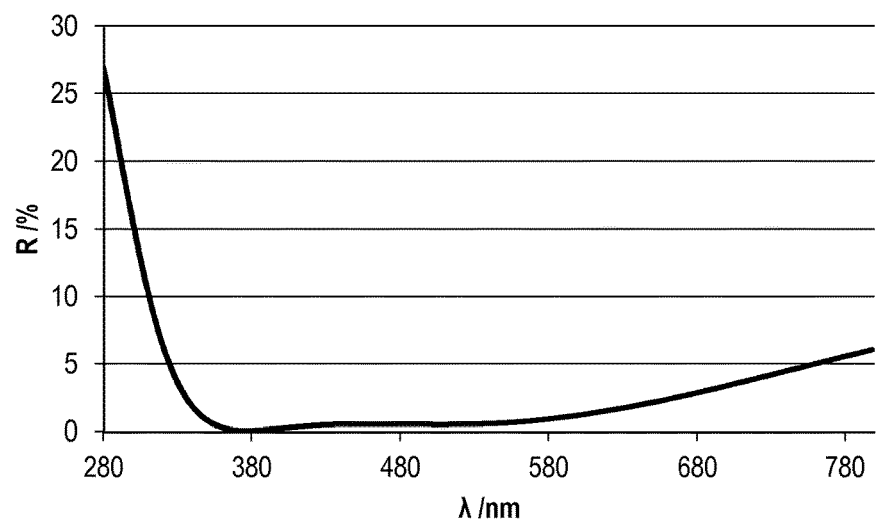
FIG. 17 shows a reflection curve of a layer system according to an exemplary embodiment of the invention with four multilayers for an application as anti-reflective red coating.

FIG. 17 shows a reflection curve of a layer system 10 according to an exemplary embodiment of the invention with four multilayers 20, 22, 24, 26 for an application as an anti-reflective red coating, wherein the reflection R in % is shown over the wavelength λ in nm. In this exemplary embodiment the UV component is effectively blocked, since the reflection in this range below approximately 350 nm is very high. At the same time, however, the reflection also increases from 580 nm, which means that the anti-reflective layer system also reflects the red component of the light even reflected, whilst the transmission between 380 nm and 580 nm is very high.

Figure 18:
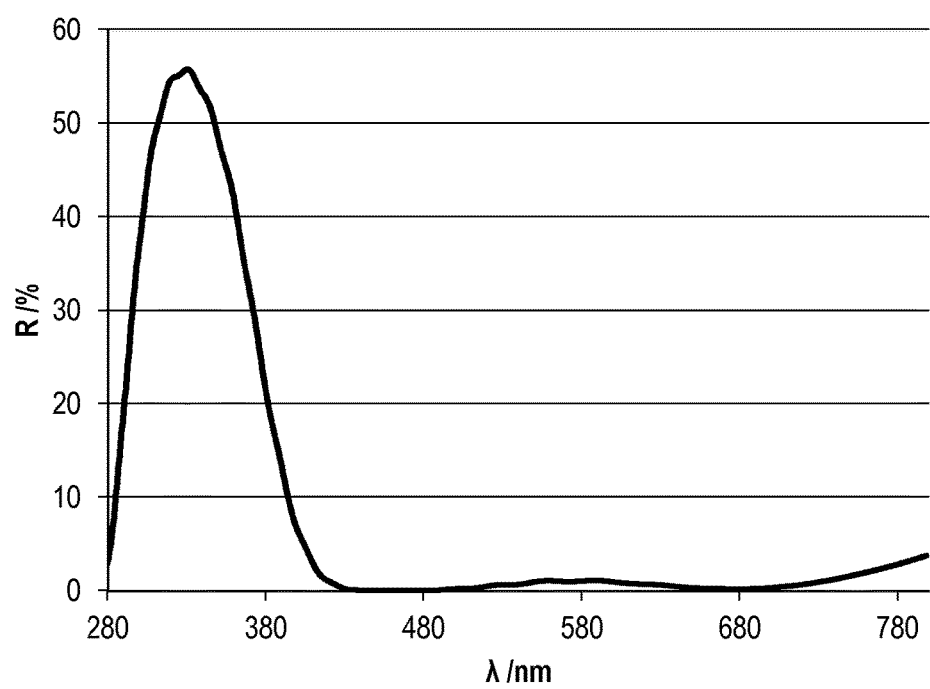
FIG. 18 shows a reflection curve of a layer system according to an exemplary embodiment of the invention with four multilayers for an application as anti-reflective yellow coating.

FIG. 18 shows a reflection curve of a layer system 10 according to an exemplary embodiment of the invention with four multilayers 20, 22, 24, 26 for an application as an anti-reflective yellow coating, wherein the reflection R in % is shown over the wavelength λ in nm. In this exemplary embodiment a maximum reflection at a wavelength of approximately 350 nm can be recognised, whilst the range above 400 nm has a very low reflection. As a result the component of the light which is transmitted is clearly in the yellow range, since the blue range is reflected.

Figure 19:
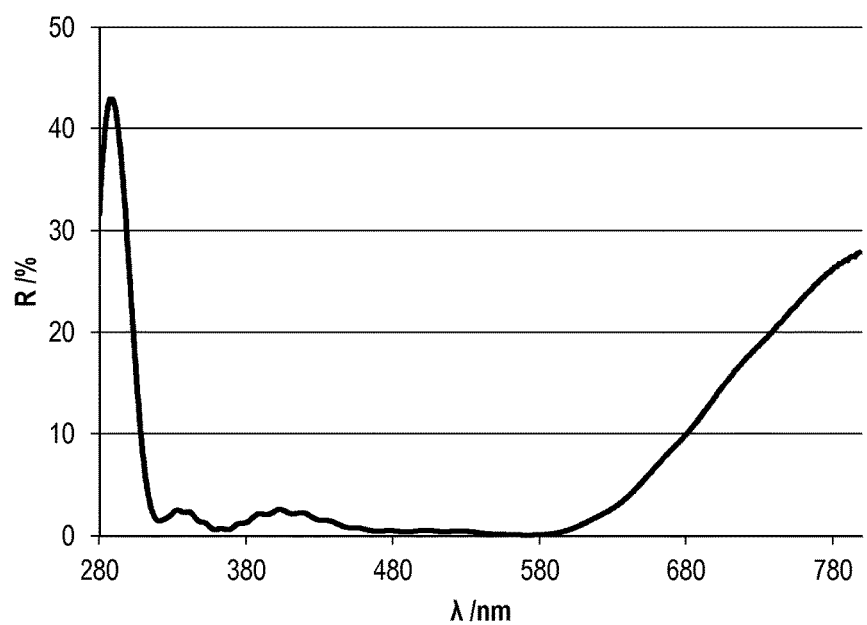
FIG. 19 shows a reflection curve of a layer system according to an exemplary embodiment of the invention with four multilayers for an application as red mirroring.

FIG. 19 shows a reflection curve of a layer system 10 according to an exemplary embodiment of the invention with four multilayers 20, 22, 24, 26 for an application as a red mirroring, wherein the reflection R is shown in % over the wavelength λ in nm. In this exemplary embodiment the reflection both below 300 nm and also in the red range above 580 nm increases substantially, which means that the mirroring layer appears as red.

Figure 20:
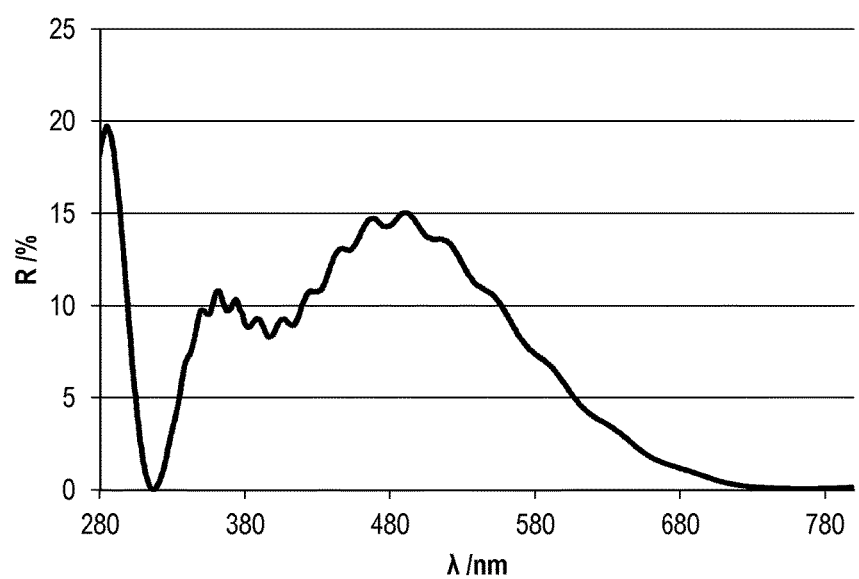
FIG. 20 shows a reflection curve of a layer system according to an exemplary embodiment of the invention with four multilayers for an application as blue mirroring.

On the other hand, FIG. 20 shows a reflection curve of a layer system 10 according to an exemplary embodiment of the invention with four multilayers 20, 22, 24, 26 for an application as a blue mirroring, wherein the reflection R in % is shown over the wavelength λ in nm. In this exemplary embodiment there is a relatively high reflection in a wavelength range between approximately 350 nm and 580 nm. This makes the mirroring layer appear blue, since the red component of the light above approximately 580 nm is transmitted.

The invention claimed is:

1. A method for producing an optical element, comprising an interferometric layer system arranged on at least one surface of a substrate with a stack of at least three successive multilayers, each multilayer comprising a first layer with a first optical phase and a second layer with a second optical phase that is different from the first optical phase, the optical phase being $(d/\lambda)*n$ where d is a layer thickness, λ is a design wavelength and n is an index of refraction for the layer, wherein the first layer is a high refractive layer having a refractive index higher than the second layer which is a low-refractive layer, wherein the first layer is under the second layer, wherein a product of reflectivity, averaged over the visible range of the light from 380 nm to 800 nm and the ratio of quotients is less than 1 in order to achieve an anti-reflection and/or anti-reflective effect of the stack of multilayers, or is set to be greater than or equal to 1 in order to achieve a mirroring effect of this stack, and wherein a ratio of quotients of the optical phase of the first layer and the optical phase of the second layer of the respective multilayer for a parameter for a stack of three or five successive multilayers is $$\sigma = \frac{v_1}{\sum_{i=2}^{nmax} v_i}$$

and wherein i=1 to nmax, for nmax=3 or nmax=5, denotes the order of the multilayers in the stack, and $v_i$ results from a quotient of the optical phase of the first layer to the second layer of a respective multilayer, or for a stack of four successive multilayers is $$\sigma = \frac{v_1 + v_2}{v_3 + v_4}$$

wherein the digits 1 to 4 denote the order of the multilayers in the stack, and $v_i$ with i=1 to 4 results from a quotient of the optical phase of the first layer to the second layer of a respective multilayer, selecting a value for the product of reflectivity and the ratio of quotients; and forming the thickness of the layers in the multilayers to achieve the selected value.

2. The method according to claim 1, wherein in the optimisation process, as limiting values, minimum values of 2 nm and maximum values of 150 nm are set for the layer thicknesses of the layers with the higher refractive index, and also minimum values of 0.01 and maximum values of 0.55 are set for the first optical phases, and wherein, as limiting values, minimum values of 2 nm and maximum values of 200 nm are set for the layer thicknesses of the layers with the lower refractive index, and also minimum values of 0.01 and maximum values of 0.53 are set for the second optical phases.

3. The method according to claim 1, wherein the stack of multilayers has an anti-reflective effect if the parameter is set to less than 4.

4. The method according to claim 1, wherein a functional is arranged between the first layer and second layer of a last multilayer of the stack of multilayers.

5. The method according to claim 1, wherein a layer system is arranged in each case on two opposing surfaces of the substrate to form a two layer system.

6. The method according to claim 5, wherein the two layer systems have a different number of multilayers.

* * * * *